(12) United States Patent
Cahill et al.

(10) Patent No.: US 8,270,905 B1
(45) Date of Patent: Sep. 18, 2012

(54) NEAR-FAR SENSING USING FREQUENCY SWEPT RSSI

(75) Inventors: Stephen V. Cahill, Felton, CA (US); Douglas K Rosener, Santa Cruz, CA (US)

(73) Assignee: Plantroncis, Inc., Santa Cruz, CA (US)

( * ) Notice: Subject to any disclaimer, the term of this patent is extended or adjusted under 35 U.S.C. 154(b) by 677 days.

(21) Appl. No.: 11/906,670

(22) Filed: Oct. 2, 2007

(51) Int. Cl.
*H04B 17/00* (2006.01)
*G01S 11/06* (2006.01)

(52) U.S. Cl. ............................ 455/67.11; 342/118
(58) Field of Classification Search .................. None
See application file for complete search history.

(56) References Cited

U.S. PATENT DOCUMENTS

| | | | | |
|---|---|---|---|---|
| 5,912,619 | A * | 6/1999 | Vogt .............................. | 340/545.1 |
| 7,010,332 | B1 * | 3/2006 | Irvin et al. ................... | 455/575.2 |
| 2002/0123309 | A1 * | 9/2002 | Collier et al. ................ | 455/67.1 |
| 2005/0020277 | A1 * | 1/2005 | Krumm et al. .............. | 455/456.1 |
| 2006/0104235 | A1 * | 5/2006 | Fritz et al. ................... | 370/328 |
| 2006/0273888 | A1 * | 12/2006 | Yamamoto ................. | 340/426.36 |
| 2007/0188375 | A1 * | 8/2007 | Richards et al. ............ | 455/39 |
| 2008/0036647 | A1 * | 2/2008 | Jung ............................ | 342/118 |
| 2008/0258553 | A1 * | 10/2008 | Christenson et al. ........ | 307/10.2 |
| 2009/0082055 | A1 * | 3/2009 | Mueller ....................... | 455/522 |

OTHER PUBLICATIONS

Gregory, Peter; Doria, Tom; Stegh, Chris; Su, Jim; SIP Communications for Dummies, Avaya Custom Edition, 2006, Wiley Publishing, Inc., Hoboken, NJ, USA.

* cited by examiner

*Primary Examiner* — Matthew D Anderson
*Assistant Examiner* — Gennadiy Tsvey
(74) *Attorney, Agent, or Firm* — Chuang Intellectual Property Law

(57) ABSTRACT

A method and apparatus for determining proximity of a headset relative to its base. A plurality of frequency swept RSSI signals are measured and processed to determine a near status or a far status of the headset relative to its base. In one example, a peak RSSI signal is identified in the plurality of frequency swept RSSI signals. The peak RSSI signal is compared to a near/far threshold RSSI value to generate a near status or far status indication.

24 Claims, 20 Drawing Sheets

NEAR-FAR SENSING USING FREQUENCY SWEPT RSSI

BACKGROUND OF THE INVENTION

Often in communications, it is desirable to know the relative position of a radio with respect to its communication base (also referred to herein as a "base station" or simply "base"). In one example application, this information is useful in systems related to "presence". The term presence generally refers to information about a user's ability or willingness to communicate. In the prior art, the concept of using presence in communication systems is often applied in instant messaging systems. Presence is also used in other network communication systems, such as the Microsoft Unified Communication Service. As applied to the field of headsets, typical presence information may include, for example, whether the headset is being worn by the user, the proximity of the user to the base station, other usage information related to the headset, and whether the user desires to be called.

In some applications, the position information required may be a NEAR/FAR binary state, namely either a closer proximity (referred to herein as a "near" or "NEAR" state) or relatively farther proximity (referred to herein as a "far" or "FAR" state), with the threshold between the two states set by the application. One indicator of relative position is received radio signal strength. Often a number is assigned to this strength and is referred to as the received signal strength indication (RSSI). Most manufacturers who report RSSI generally estimate the received signal power at the antenna either by direct measurement, or digital signal processing, and report a monotonically increasing number with respect to this power. The number is often calibrated to track power linearly and report the value in dBm.

Received signal strength depends on transmit power level, the direct line of sight distance between transmitter and receiver and any reflected radio waves received (multi-path). As the direct line of sight distance increases (for fixed transmit power), the received amplitude decreases (square law for free-space, no reflections). In some situations, the direct path is blocked and only reflections are received.

When the direct path is not blocked, deep fades can be caused by reflectors at or beyond the first Fresnel zone. Fresnel zones are ellipsoids with transmitter and receiver at the foci and the surface defined by all paths that are an odd-multiple of a half-wavelength farther than the direct path between transmitter and receiver, causing cancellation (assuming no phase shift at the reflector).

If the reflector is at an even multiple of a half-wavelength, the direct and reflected waves can constructively interfere (again assuming no phase shift at the reflector) and the received amplitude is twice as large (6 dB) as the direct path alone. In general, accurate predictions of real situations are difficult, but one can state in general that the actual Received Signal Strength Indication (RSSI) can vary by +6 dB to −infinity depending on the reflector configuration.

When the direct path is blocked, fades can also occur. Simple analysis is more difficult, but statistical models have been made, and again generally RSSI will decrease with distance. Often one reflector dominates, and the simple analysis above for direct path fading can be used.

If RSSI is measured at the fade frequency, the estimated position based on RSSI can be very inaccurate. If a threshold is used to determine NEAR/FAR, it can be triggered at a close range. FIG. 6 is a graph illustrating a simplified RSSI profile 602, an average RSSI 604, and peak RSSI 606 as a function of frequency at a near range of approximately 17 inches to the base station (the $7^{th}$ Fresnel zone for 2.45 GHz ISM band.)

FIG. 7 is a graph illustrating an RSSI profile 702, average RSSI 704, and peak RSSI 706 as a function of frequency at a FAR range of approximately fourteen feet to the base station (the 71st Fresnel zone for 2.45 GHz ISM band.). As shown in FIG. 7, the farther away the headset from the base station, the more frequency sensitive the fades become, but the less bothersome if averaging is used. FIGS. 6 and 7 are simplified RSSI models involving a direct signal and a single bounce signal, totally reflected. As shown in FIG. 6, a peak RSSI signal value 606 would be within 6 dB of the line of sight value alone (0 dB), whereas an average RSSI value 604 could be more than 15 dB or more below the line of sight value, even at close range, causing a false FAR report.

If the headset is sufficiently FAR away, the occasional places where constructive interference occurs between line of sight and a strong reflection will yield approximately 6 dB above a square law estimate. There are also changes due to polarization of antennas and reflection effects. Again, statistically, one would expect to see times when polarization line up and others where there is fading due to cross-cancellation. In headset applications, generally polarization cannot be guaranteed due to how the user wears the headset, and a varying reflective environment.

In the prior art, one way to improve RSSI measurements is to measure it across several frequencies. This is done intrinsically by frequency-hopping systems such as Bluetooth. In the prior art, the RSSI is often reported as the average RSSI value over packets sent at each of the hopping frequencies. However, using the average RSSI value when there is multi-path is problematic, as the fade can drag down the average RSSI value significantly. Close-in, the majority of the band can be in fade.

OFDM also characterizes RSSI over the band. By using pilots at different frequencies, it senses the fades and can provide equalization to transmitted data. But this information has not typically been used for ranging.

As a result, there is a need for improved methods and apparatuses for headset ranging relative to its radio base.

BRIEF DESCRIPTION OF THE DRAWINGS

The present invention will be readily understood by the following detailed description in conjunction with the accompanying drawings, wherein like reference numerals designate like structural elements.

FIG. 3 is meant to illustrate that the NEAR/FAR determination application can reside on either the headset or the base station.

FIG. 11 is meant to illustrate the example where both the base station and headset make independent determinations of Near/Far using RSSI and both must agree to report a Near/Far transition.

DESCRIPTION OF SPECIFIC EMBODIMENTS

Figure 1:
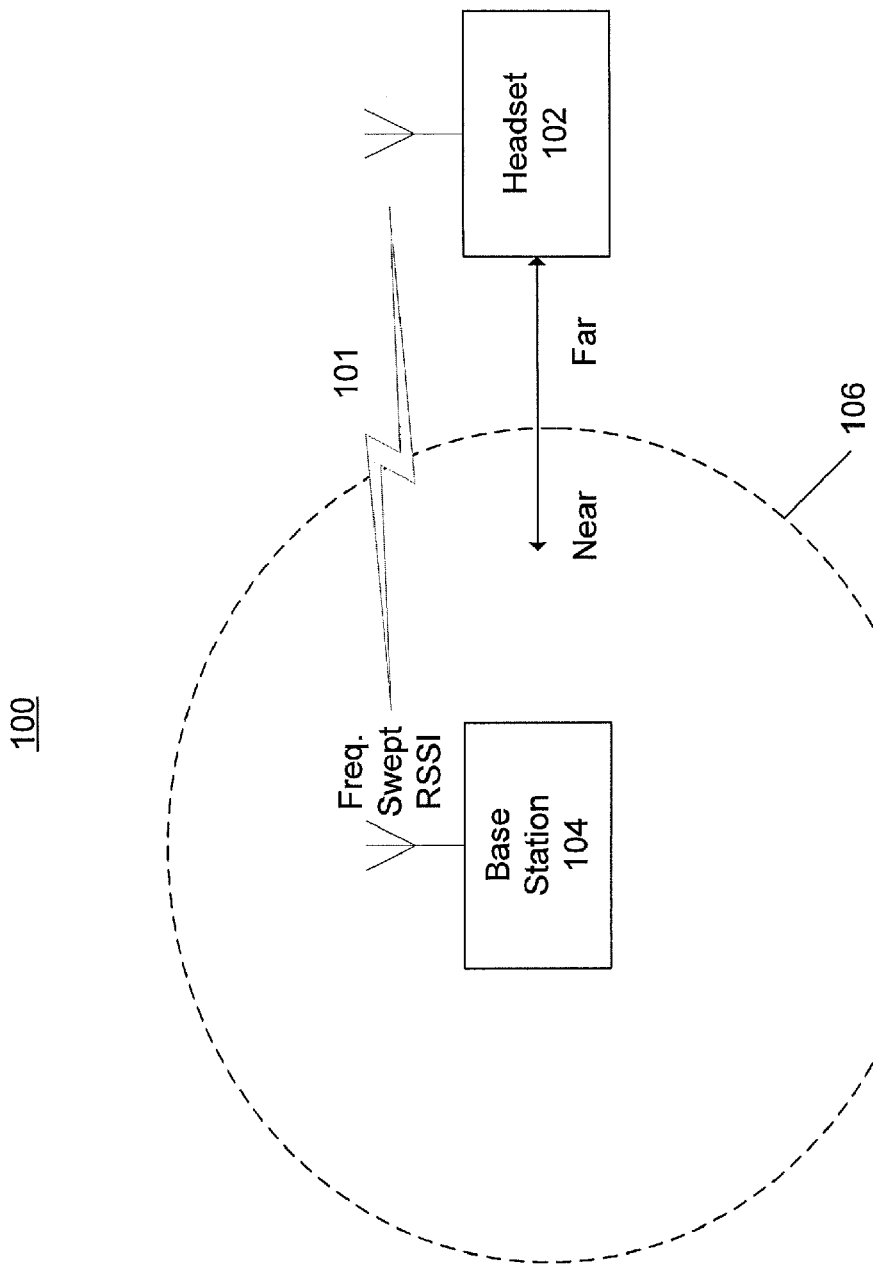
FIG. 1 illustrates NEAR/FAR sensing of a headset in relation to a base station.

Methods and apparatuses for headset proximity determination are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates generally to proximity determination of a mobile radio relative to its base radio. In one example, this description describes a method and apparatus for a determining NEAR or FAR status of a headset using frequency swept RSSI measurements. In one example, RSSI measurements are sampled across the frequency band, either by a naturally hopping system or by forcibly hopping around the frequency band. The gathered RSSI measurements are processed to determine NEAR/FAR status of the headset. In one example, the processing involves correlation of the RSSI envelope across the band. In a further example, the peak RSSI value measured is used. In all cases, RSSI can be measured at the mobile radio or the base radio.

In one example of the invention, a frequency hopped system such as Bluetooth takes RSSI measurements at each hop frequency. By recording the peak value of RSSI from the collection of measured RSSI at each hop frequencies over the band, one mollifies the effects of a multi-path nulls have on an average RSSI value, especially at close range. This is due to the fact that at close range, a significant part of the communication band can be affected and lower the average RSSI. The frequencies away from the fade will have a much higher value, and the peak RSSI value away from the fade is closer to the ideal of a multi-path free measurement.

In a further example, for non-hopped systems such as DECT, beacons (transmissions at times and/or frequencies not normally used for data communication) are used across the band and monitored by the receiver periodically. The peak RSSI of all the beacons can be used as a measure for relative position. For DECT, either the DECT signal periodically change carriers to get a sense of what the peak signal level is, or a moving beacon is used, and is measured by a moving receiver. Fixed beacons are spectrally-inefficient, may not be allowed, and burn power. The DECT system periodically measures all carriers and available timeslots on both ends (at least every 10 seconds, sometimes much faster), so the system knows where to go to if problems arise; the ends are synchronized, so it is possible to put up a beacon from time to time in a timeslot that the other end is going to be listening in. The signal level vs. frequency profile is then measured. In a further example, a frequency hopped DECT system is operated in the same manner as other frequency hopped systems. Finally in OFDM systems, the peak value of all the pilots can be used as a measure of RSSI for relative position determination.

In these example systems, it's also possible to determine range by examining the fading profile over time. This is done (once the signal level is being measured either as part of normal hopping or by means of a probing beacon) by calculating the autocorrelation of the RSSI as a function of frequency offset. A well-correlated (over a large number of frequencies) result corresponds to the headset being NEAR to the base. A poorly correlated result (correlated over a narrow band of frequencies) corresponds to the headset being FAR from the base. This is a result of the degree of frequency selectivity that fading exhibits as a function of distance.

By averaging several across-the-band peak measurements or correlations (as described above), one mollifies the effects of transitory multi-path while moving or touching the headset, requiring a long-term change to trigger a NEAR/FAR transition. In one example, hysteresis is employed on the thresholds to mollify the effects of transitory multi-path while moving, or touching the headset, requiring a significant RSSI change to trigger a NEAR/FAR transition. The herein described methods and systems provide several advantages over the prior art, such as increasing the reliability of NEAR/FAR presence based RSSI.

In one example, a method for determining a NEAR status or a FAR status of a headset in relation to a base unit includes measuring a plurality of RSSI signals, where each RSSI signal of the plurality of RSSI signals is measured at a different carrier frequency. The method further includes identifying a peak RSSI signal in the plurality of RSSI signals and comparing the peak RSSI signal to a NEAR/FAR threshold RSSI value. A NEAR status or FAR status indication is generated responsive to comparing the peak RSSI signal to the NEAR/FAR threshold RSSI value.

In a further example, a method for determining a NEAR status or a FAR status of a headset in relation to a base unit includes measuring a plurality of headset RSSI signals at a headset, where each headset RSSI signal of the plurality of headset RSSI signals is measured at a different carrier frequency. The method further includes identifying a peak headset RSSI signal in the plurality of headset RSSI signals and comparing the peak headset RSSI signal to a headset NEAR/FAR threshold RSSI value. A first NEAR status or FAR status indication is generated responsive to comparing the peak headset RSSI signal to a headset NEAR/FAR threshold RSSI value. A plurality of base station RSSI signals at a base station are measured, where each base station RSSI signal of the plurality of base station RSSI signals is measured at a different carrier frequency. The method further includes identifying a peak base station RSSI signal in the plurality of base station RSSI signals and comparing the peak base station RSSI signal to a base station NEAR/FAR threshold RSSI value. A second NEAR status or FAR status indication is generated responsive to comparing the peak base station RSSI signal to a base station NEAR/FAR threshold RSSI value. The first NEAR status or FAR status indication and the second NEAR status or FAR status indication are compared and a third NEAR status or FAR status indication is responsively output.

In a further example, a method for determining a NEAR status or a FAR status of a DECT headset in relation to a base unit includes selecting a plurality of frequency beacons within a DECT frequency bandwidth. A plurality of RSSI signals are measured, where each RSSI signal of the plurality of RSSI signals is measured at a different frequency beacon. A peak RSSI signal is identified in the plurality of RSSI signals. The peak RSSI signal is compared to a NEAR/FAR threshold RSSI value and a NEAR status or FAR status indication is generated.

In a further example, a wireless headset includes a wireless transceiver for sending and receiving signals, and a memory storing a NEAR/FAR application program for determining a NEAR status or a FAR status of the headset relative to a base station. The wireless headset further includes a processor for executing the NEAR/FAR application program to process a plurality of RSSI signals measured at different carrier frequencies, where a peak RSSI signal in the plurality of RSSI signals is identified and compared to a NEAR/FAR threshold RSSI value to generate a NEAR status or FAR status indication.

In a further example, a wireless headset includes a wireless transceiver for sending and receiving signals, and a memory storing a NEAR/FAR application program for determining a NEAR status or a FAR status of the headset relative to a base station. A processor executes the NEAR/FAR application program to process a plurality of RSSI signals measured at different carrier frequencies, where a peak RSSI signal in the plurality of RSSI signals is identified and compared to a NEAR/FAR threshold RSSI value to generate a NEAR status or FAR status indication.

In a further example, a wireless headset base station includes a network interface, a wireless transceiver for sending and receiving signals, and a memory storing a NEAR/FAR application program for determining a NEAR status or a FAR status of the headset relative to a base station. A processor executes the NEAR/FAR application program to process a plurality of RSSI signals measured at different carrier frequencies, where a peak RSSI signal in the plurality of RSSI signals is identified and compared to a NEAR/FAR threshold RSSI value to generate a NEAR status or FAR status indication.

In a further example, a method for determining a near status or a far status of a headset in relation to a base unit includes measuring a plurality of RSSI signals, where each RSSI signal of the plurality of RSSI signals is measured at a different carrier frequency. The method further includes calculating an autocorrelation of the plurality of RSSI signals as a function of frequency, and determining whether the autocorrelation is well correlated or poorly correlated. A near status indication or far status indication is generated responsive to determining whether the autocorrelation is well correlated or poorly correlated.

FIG. 1 illustrates NEAR/FAR sensing of a headset in relation to a base station. FIG. 1 is a drawing illustrating how RSSI may be employed to determine proximity of an intelligent headset to a wireless base station, in accordance with an aspect of the present invention. The received signal strength indicator (RSSI) of the wireless link 101 is measured and monitored to determine the proximity of the headset 102 from the base station 104. The RSSI can be measured and monitored either at the headset 102 or at the base station 104. If measured and monitored at the base station 104, the headset 102 can be configured to query the base station 104 as to what the RSSI is. Then, the RSSI, together with known transmit power, allows base proximity to be determined.

Referring now to FIG. 1, a system 100 includes a headset 102 and a base station 104 capable of wireless communication there between. Base station 104 is coupled to a telecommunications network. In one example, base station 104 may be used to route calls to multiple wireless headsets. In system 100, a NEAR/FAR boundary 106 establishes a range from base station 104 below which headset 102 is considered to be in a "NEAR" status and beyond which headset 102 is considered to be in a "FAR" status. System 100 utilizes RSSI values at different frequencies in determining whether headset 102 is in a NEAR status or FAR status.

In one example, base station 104 is an access point (AP), which is operably coupled with a network. In one example, the network may be a communications network which may include a public switched telephone network (PSTN), an integrated services digital network (ISDN), a local area network (LAN), and/or a wireless local area network (WLAN), that support standards such as Ethernet, wireless fidelity (WiFi), and/or voice over internet protocol (VoIP). In one example, the access point includes a transceiver and a processor configured to allow a wireless device (e.g., a headset) access to a network connected to the access point (e.g., via a 10/100 Ethernet RJ-45 port). The AP may be any device that allows wireless-equipped computers and other devices to communicate with a wired network. In one example, the AP is able to support WiFi in general, and the 802.11a, 802.11b, and/or 802.11g wireless networking standards in particular. In other examples, the AP may be able to support other wireless networking standards.

Figure 2:
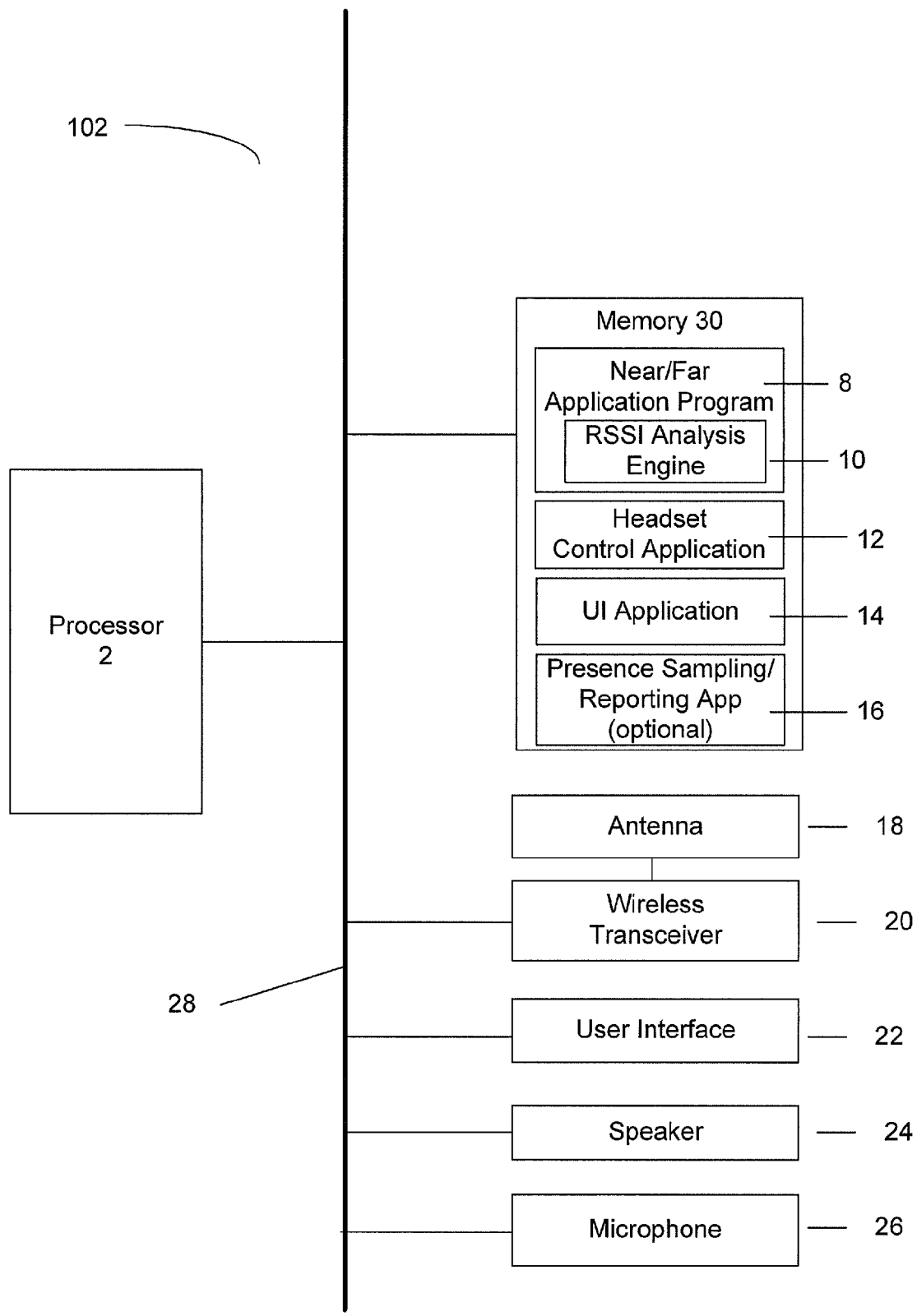
FIG. 2 illustrates a block diagram of a headset with a NEAR/FAR determination application.

FIG. 2 illustrates a block diagram of a headset with a NEAR/FAR determination application. Referring now to FIG. 2 in conjunction with FIG. 1, a block diagram of an example of headset 102 is shown. Headset 102 includes a processor 2 operably coupled via a bus 28 to a memory 30, a wireless transceiver 20 and accompanying antenna 18, a user interface 22, a speaker 24, and a microphone 26. Wireless transceiver 20 may, for example, be a DECT transceiver, Bluetooth transceiver, or IEEE 802.11 transceiver.

Processor 2 allows for processing data, in particular managing RSSI data between wireless transceiver 20 and memory 30 for determining the NEAR/FAR status of headset 102. In one example, processor 2 is a high performance, highly integrated, and highly flexible system-on-chip (SOC), including signal processing functionality such as echo cancellation/reduction and gain control in another example. Processor 2 may include a variety of processors (e.g., digital signal processors), with conventional CPUs being applicable.

Memory 30 may include a variety of memories, and in one example includes SDRM, ROM, flash memory, or a combination thereof. Memory 30 may further include separate memory structures or a single integrated memory structure. In one example, memory 30 may be used to store passwords, network and telecommunications programs, and/or an operating system (OS). Memory 30 stores a NEAR/FAR application program 8 executed by processor 2 to determine NEAR/FAR status of the headset 102. Near/Far application program 8 includes an RSSI analysis engine 10, the operation which is described in further detail below. Memory 30 may store frequency swept RSSI values and predetermined RSSI NEAR/FAR threshold values for use by NEAR/FAR application program to determine the NEAR/FAR status of headset 102. Memory 30 also includes a headset control application 12, user interface application 14, and optional presence sampling/reporting application 16.

User interface 22 allows for manual communication between the headset user and the headset, and in one example includes an audio and/or visual interface such that a prompt may be provided to the user's ear and/or an LED may be lit. The headset may include a sensor. In one example, the sensor is a motion detector. In further examples, the sensor may be an infra-red detector, a pyroelectric sensor, a capacitance circuit, a micro-switch, an inductive proximity switch, a skin resistance sensor, or at least two pyroelectric sensors for determining a difference in temperature readings from the two pyroelectric sensors.

Figure 3:
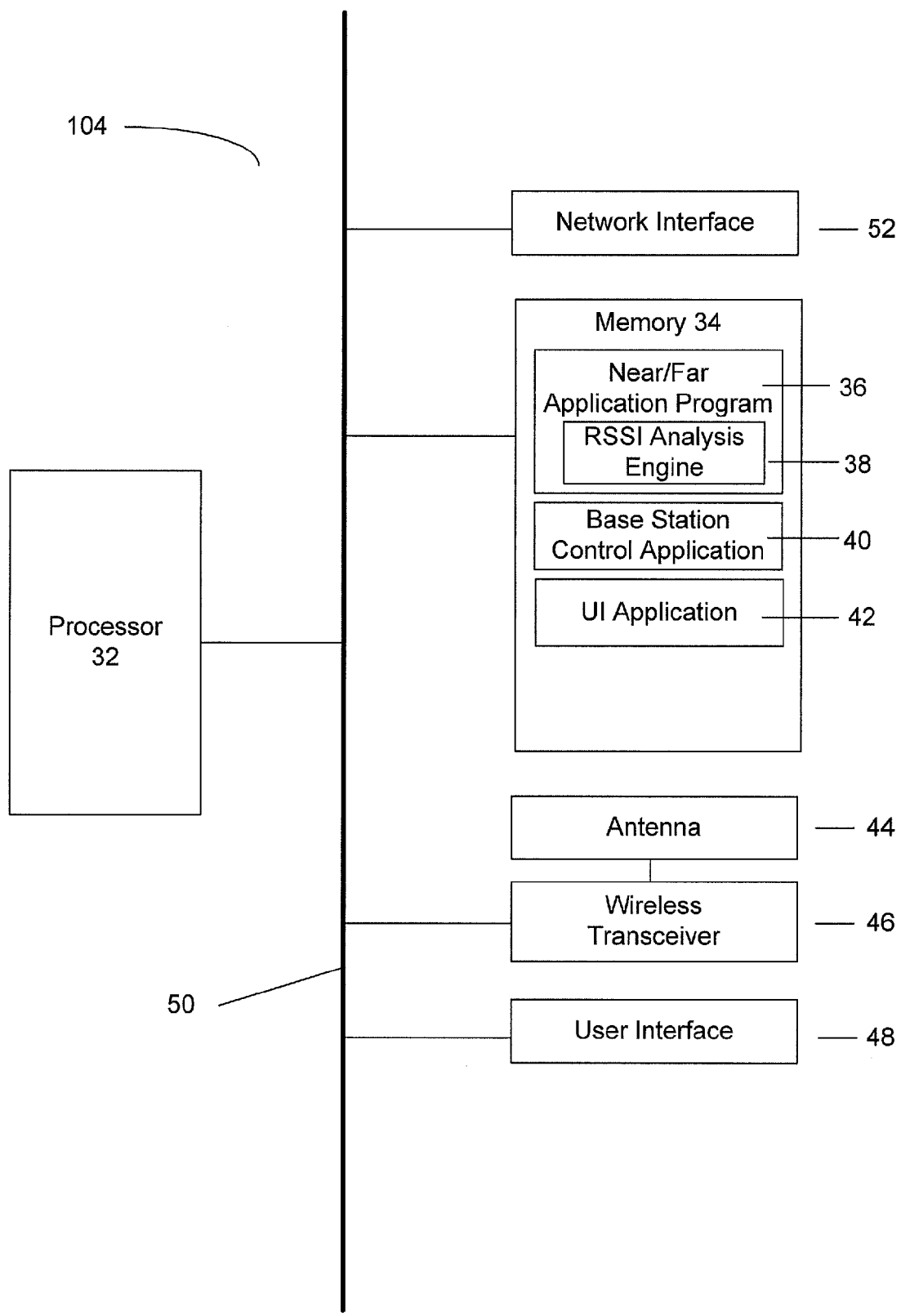
FIG. 3 illustrates a block diagram of a base station with a NEAR/FAR determination application.

FIG. 3 illustrates a block diagram of a base station with a NEAR/FAR determination application. FIG. 3 is meant to illustrate that the NEAR/FAR determination application can reside on either the headset as shown in FIG. 2, or on the base station, as shown in FIG. 3. Regardless of where the NEAR/FAR determination application resides, the result of a NEAR/FAR determination may be sent to the other device. In a further example described below in reference to FIG. 11, both a headset and a base station have a NEAR/FAR determination application.

Referring now to FIG. 3 in conjunction with FIG. 1, a block diagram of an example of base station 104 is shown. Base station 104 includes a processor 32 operably coupled via a bus 50 to a memory 34, a wireless transceiver 46 and accompanying antenna 44, a network interface 52, and a user interface 48. Wireless transceiver 46 may for example, be a DECT transceiver, Bluetooth transceiver, or IEEE 802.11 transceiver.

Processor 32 allows for processing data, in particular managing RSSI data between wireless transceiver 46 and memory 34 for determining the NEAR/FAR status of base station 104. In one example, processor 32 is a high performance, highly integrated, and highly flexible system-on-chip (SOC), including signal processing functionality such as echo cancellation/reduction and gain control in another example.

Memory 34 may include a variety of memories, and in one example includes SDRM, ROM, flash memory, or a combination thereof. Memory 34 may further include separate memory structures or a single integrated memory structure. In one example, memory 34 may be used to store passwords, network and telecommunications programs, and/or an operating system (OS). Memory 34 stores a NEAR/FAR application program 36 executed by processor 32 to determine NEAR/FAR status of the headset 102 relative to the base station 104. Near/Far application program 36 includes an RSSI analysis engine 38, the operation which is described in further detail below. Memory 34 may store frequency swept RSSI values and predetermined RSSI NEAR/FAR threshold values for use by NEAR/FAR application program to determine the NEAR/FAR status of base station 104. Memory 34 also includes a base station control application 40 and a user interface application 42. User interface 48 allows for manual communication between the base station user and the base station, and in one example includes an audio and/or visual interface.

Figure 4A:
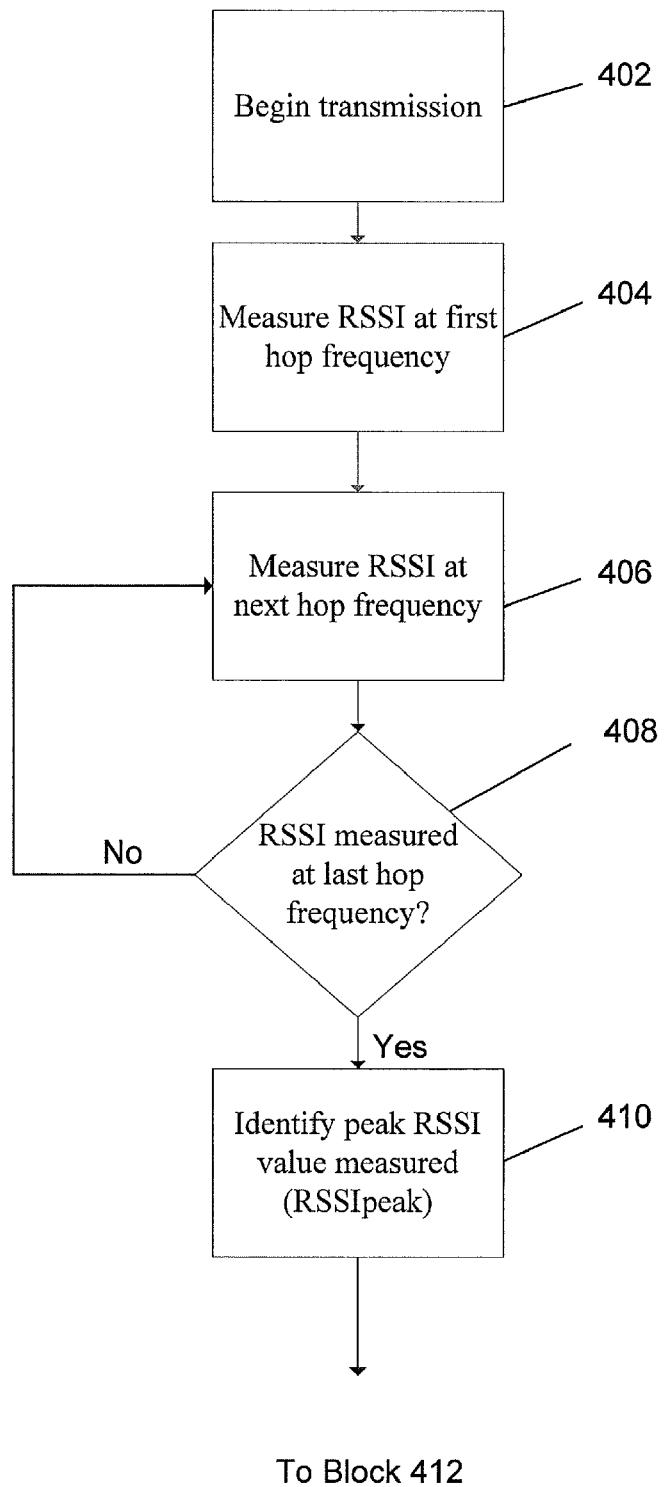
FIG. 4 is a flowchart illustrating a process by which the NEAR/FAR application determines NEAR/FAR status in one example. This is the peak RSSI method for a frequency hopped system.
Figure 4B:
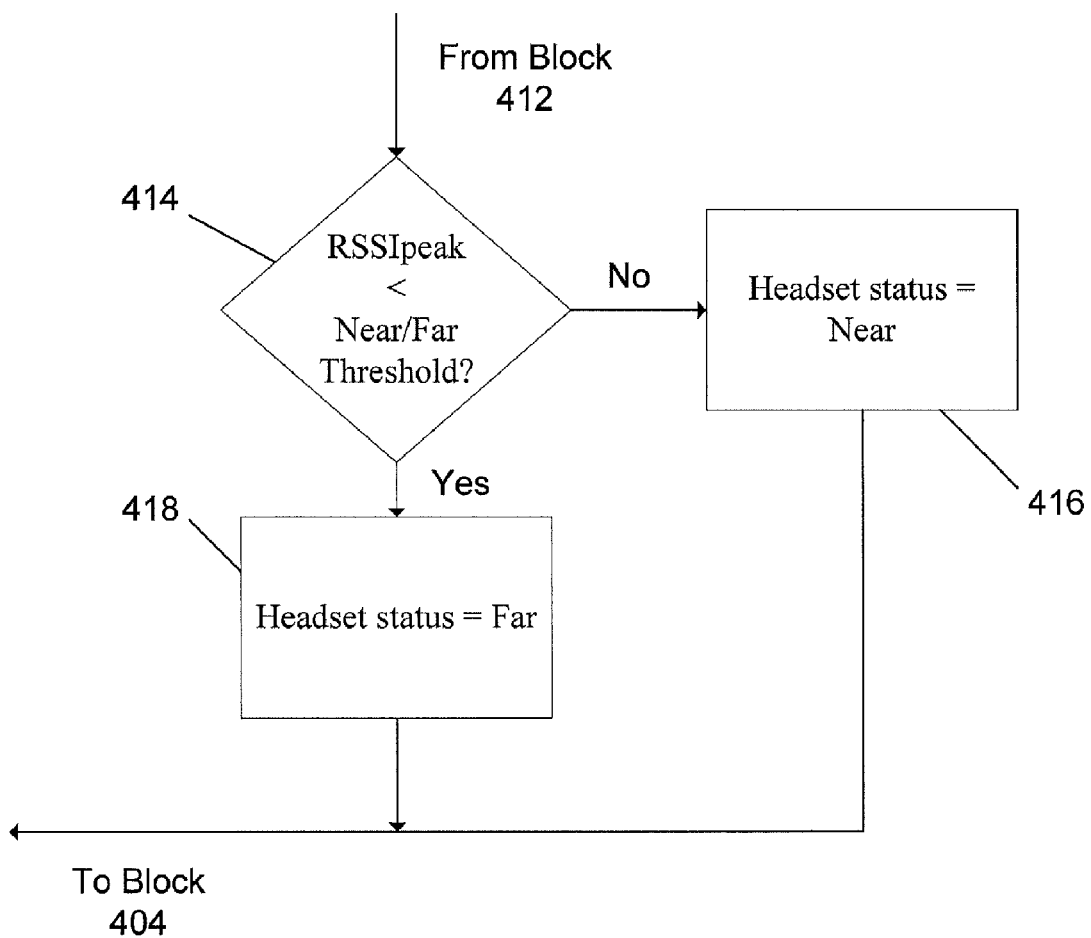

FIG. 4 is a flowchart illustrating a process by which the NEAR/FAR application determines NEAR/FAR status in one example. In this example, a peak RSSI method for a frequency hopped system such as Bluetooth is used. At block 402 transmissions between a headset and base station begins. At block 404, the RSSI is measured at a first hop frequency and stored in memory. At block 406, the RSSI is measured at a next hop frequency. At decision block 408, it is determined whether the RSSI measured at the previous hop frequency is the last hop frequency. If no, then the process returns to block 406 until yes at block 408. If yes at block 408, then at block 410, the peak RSSI value (herein also referred to as RSSI peak) is identified from the RSSI values measured at each hop frequency. At decision block 414, it is determined whether the identified RSSIpeak is less than a NEAR/FAR threshold RSSI. The NEAR/FAR threshold RSSI is the threshold value below which the headset is considered to be in FAR status and above which the headset is considered to be in NEAR status. In one example, the NEAR/FAR threshold RSSI value is previously determined empirically. If no at decision block 414, then at block 416 the headset status is set to NEAR status. If yes at decision block 414, then the headset status is set to FAR status at block 418. The process then returns to block 404.

Figure 12:
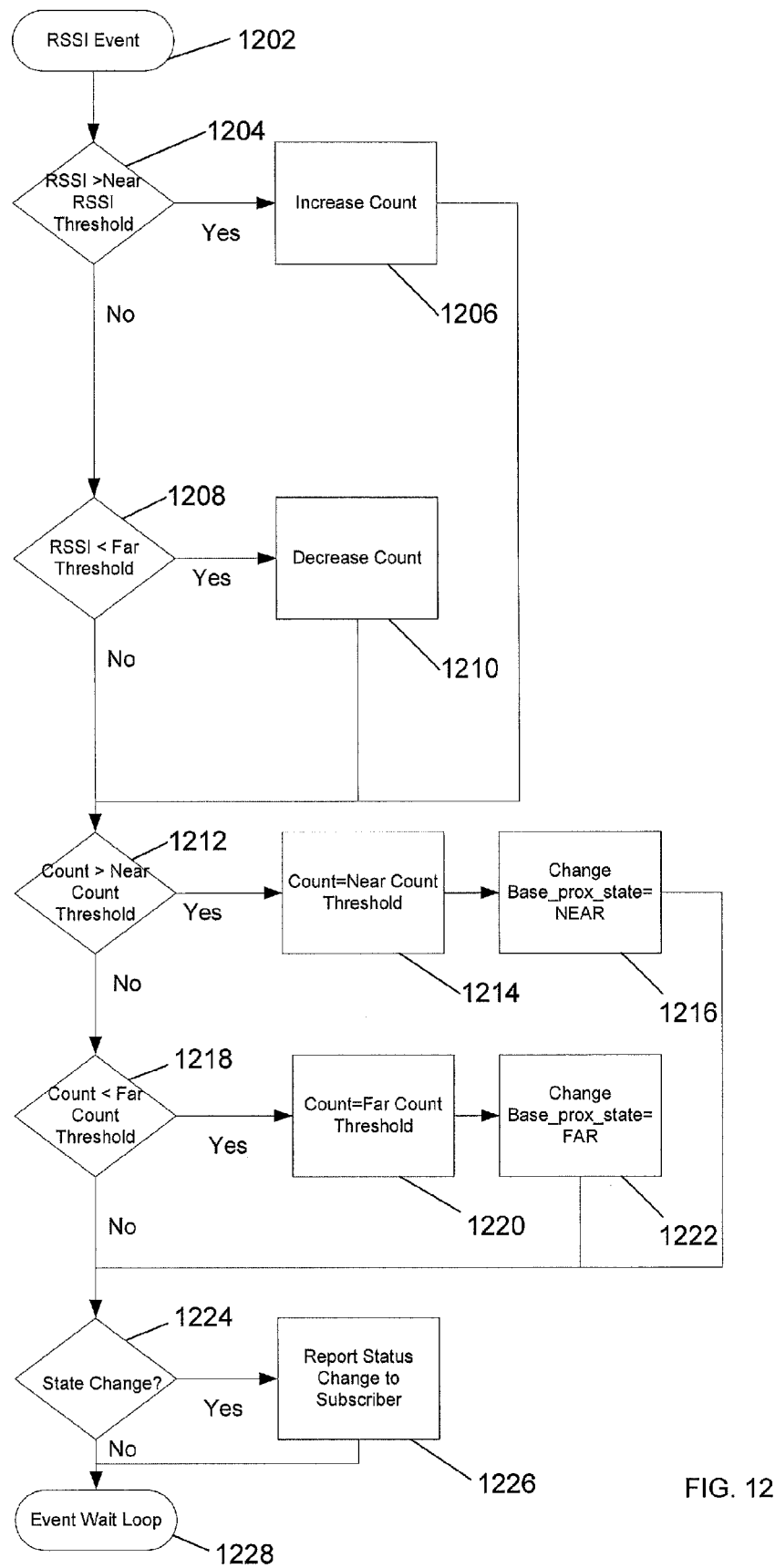
FIG. 12 is a flowchart illustrating a process by which hysteresis is used in a NEAR/FAR status determination.

In one example, hysteresis is used to prevent rapid toggling between NEAR status and FAR status. A Near RSSI threshold is pre-determined, and measured RSSI values must be above this Near RSSI threshold for a pre-determined NEAR count threshold number of times before a state change to NEAR status occurs. Similarly, a FAR RSSI threshold is predetermined, and measured RSSI values must be less than this Far RSSI threshold for a pre-determined FAR count threshold number of times before a state change to FAR status occurs. Referring to FIG. 12, at block 1202, an RSSI event occurs whereby an RSSI is measured. At block 1204, it is determined whether the measured RSSI is greater than a Near RSSI Threshold. If yes, then at block 1206 a count variable is increased by one. Following block 1206, at decision block 1212, it is determined whether the count variable is greater than a Near Count Threshold. If no at decision block 1204, at decision block 1208, it is determined if the measured RSSI is less than a Far RSSI threshold. If yes at decision block 1208, then the count variable is decreased by one.

Following block 1210, the process proceeds to decision block 1212. If the count variable is greater than the NEAR count threshold at decision block 1212, then at block 1214, the count variable is set to the Near Count Threshold. Following block 1214, at block 1216, the base proximity status (Base_prox_state) is set to NEAR status. If no at decision block 1212, at decision block 1218 it is determined if the count variable is less than a Far Count Threshold. If yes at decision block 1218, then at block 1220, the count variable is set to the Far Count Threshold. At block 1222, the base proximity status Base_prox_state is set to FAR status. If no at decision block 1218, or following block 1216 or block 1222, at decision block 1224 it is determined whether a state change has occurred. If yes at decision block 1224, at block 1226 the state change is reported. If no at decision block 1224 or following block 1226, at block 1228 the event wait loop repeats. Using this hysteresis, false NEAR/FAR transitions due to multipath are reduced.

Figure 5A:
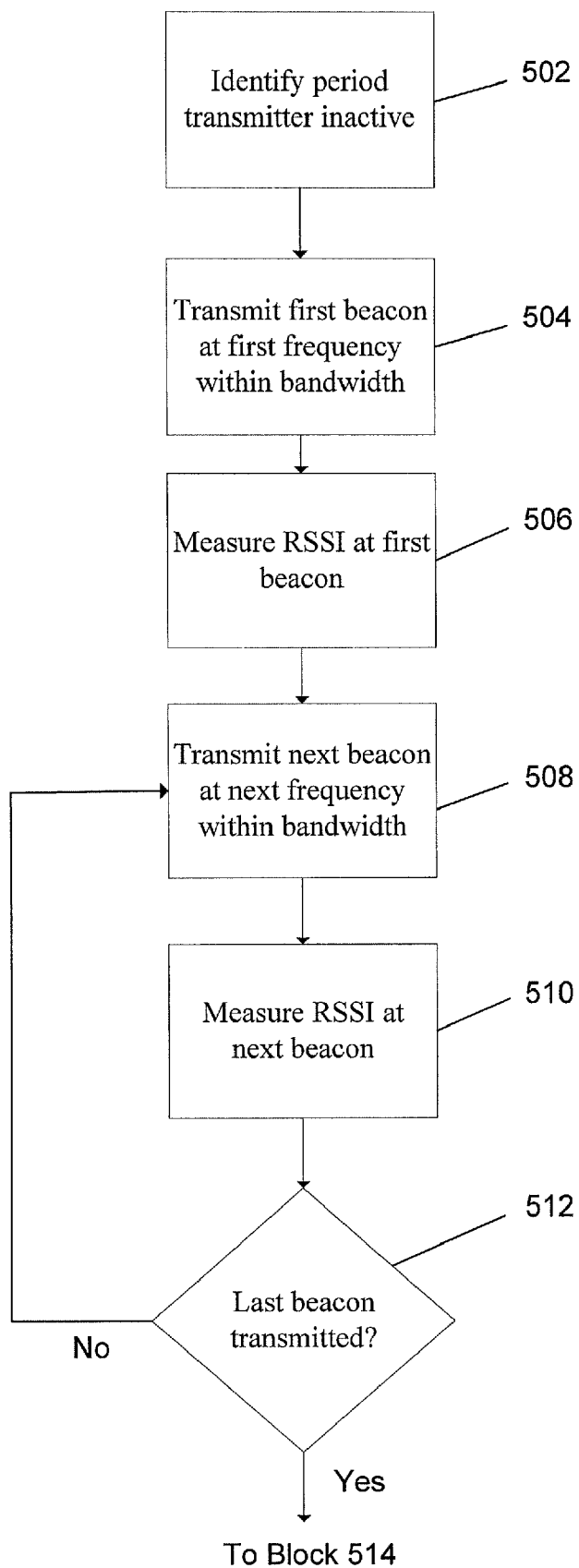
FIG. 5 is a flowchart illustrating a process by which the NEAR/FAR application determines NEAR/FAR status in one example. This is the peak RSSI method for a non-frequency hopped system.
Figure 5B:
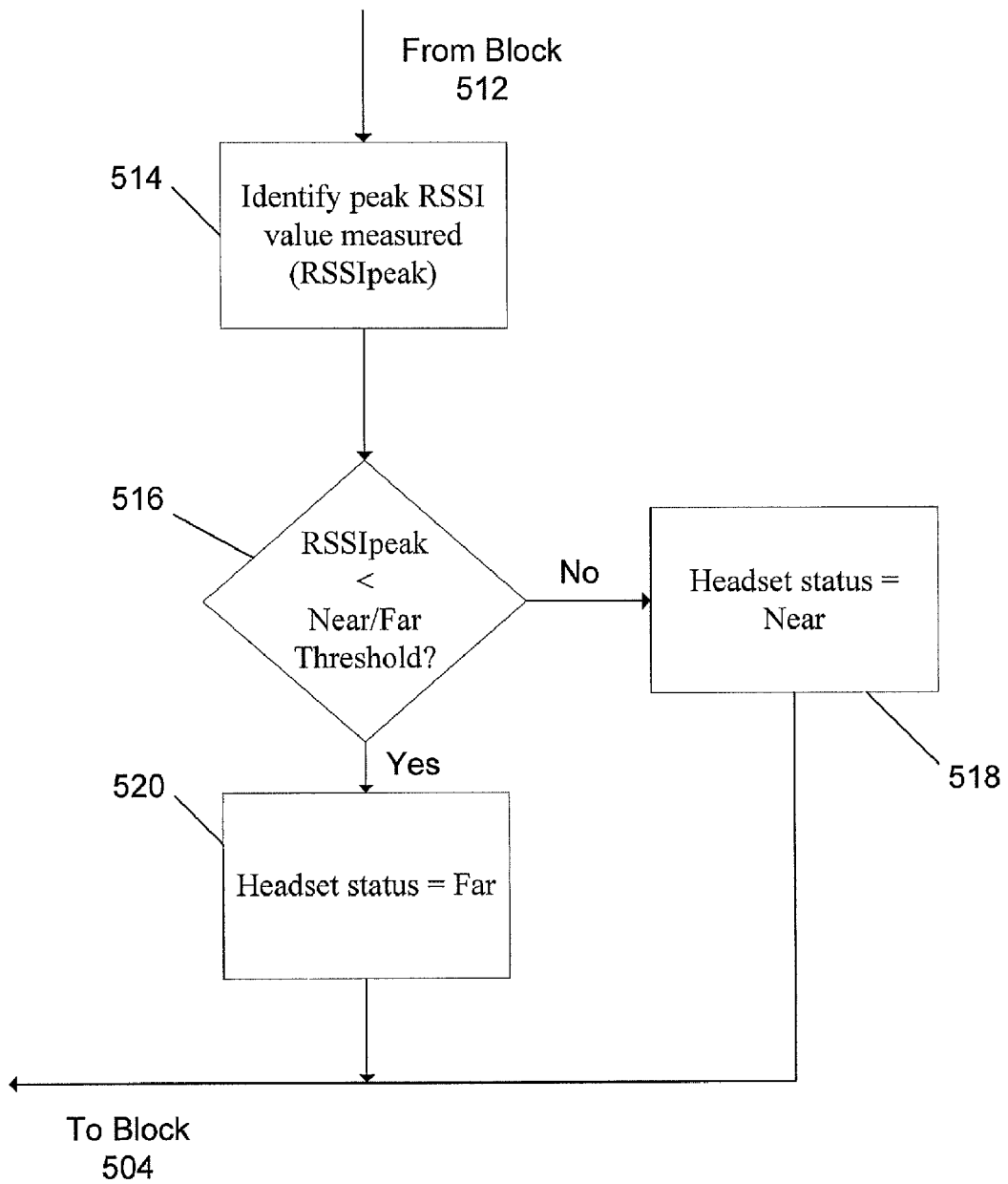
Figure 6:
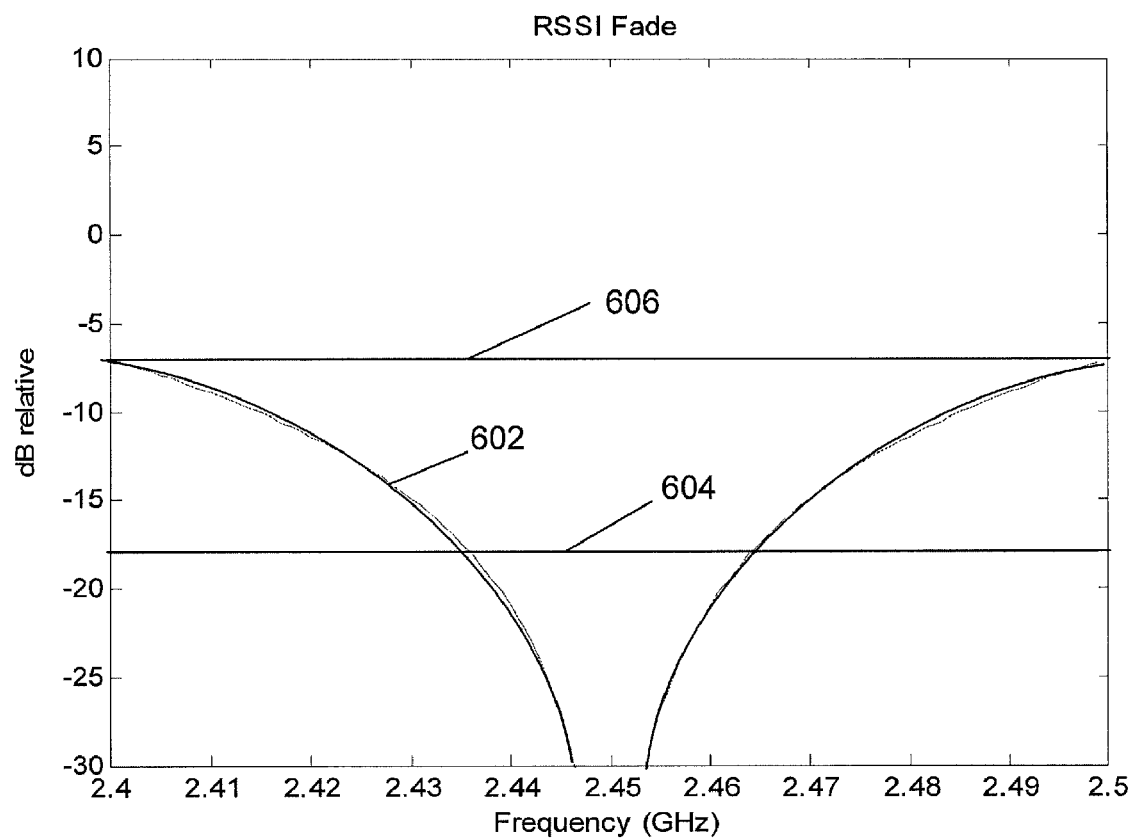
FIG. 6 is a graph illustrating an RSSI profile, average RSSI, and peak RSSI as a function of frequency at a near range to the base station.
Figure 7:
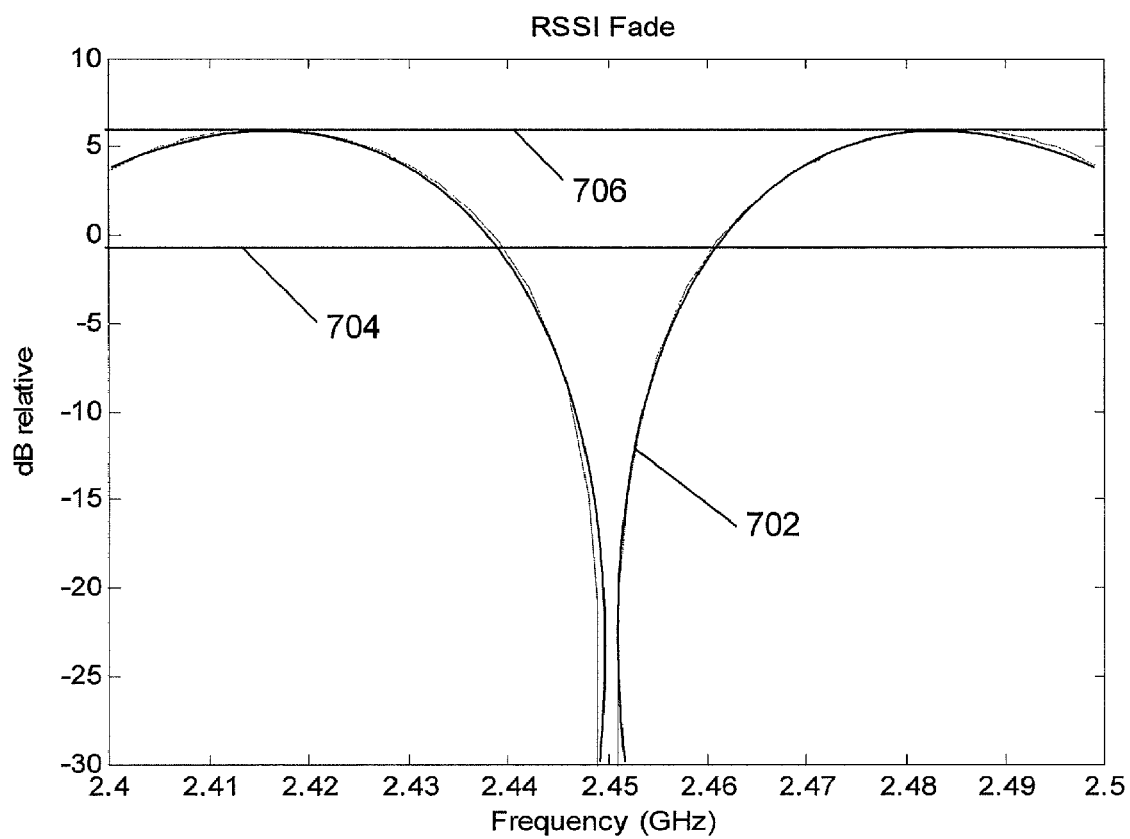
FIG. 7 is a graph illustrating an RSSI profile, average RSSI, and peak RSSI as a function of frequency at a FAR range to the base station.

FIG. 5 is a flowchart illustrating a process by which the NEAR/FAR application determines NEAR/FAR status in a further example. In this example, the peak RSSI method for a non-frequency hopped DECT system is used. In this example, independent transmissions between the headset and base station link are used. The transmitter is on, on each end of the link, roughly 4% duty cycle during normal DECT operation. The rest of the time it's off, and at least half the time is available. During this inactive period, the transmitter is programmed to go to an alternate carrier and send a transmission, and also a variety of different carriers, and monitor the reception on the other end. In this manner, the signal path is mapped out from between the two ends of the link.

At block 502, the period that the DECT transmitter is inactive is identified. At block 504, a first beacon at a first frequency within the DECT bandwidth is transmitted. At block 506, the RSSI value at the first beacon is measured. At block 508, a next beacon at a next frequency within the DECT bandwidth is transmitted. At block 510, the RSSI value at the next beacon is measured. At decision block 512, it is determined whether the last beacon has been transmitted. If no at decision block 512, then the process returns to block 508 until yes. If yes at decision block 512, then at block 514, the peak RSSI is identified from the RSSI values measured at each beacon. At decision block 516, it is determined whether the identified RSSI peak is less than a NEAR/FAR threshold RSSI. If no at decision block 516, then at block 518 the headset status is set to NEAR status. If yes at decision block 516, then at block 520 the headset status is set to FAR status. The process then returns to block 504.

Figure 8:
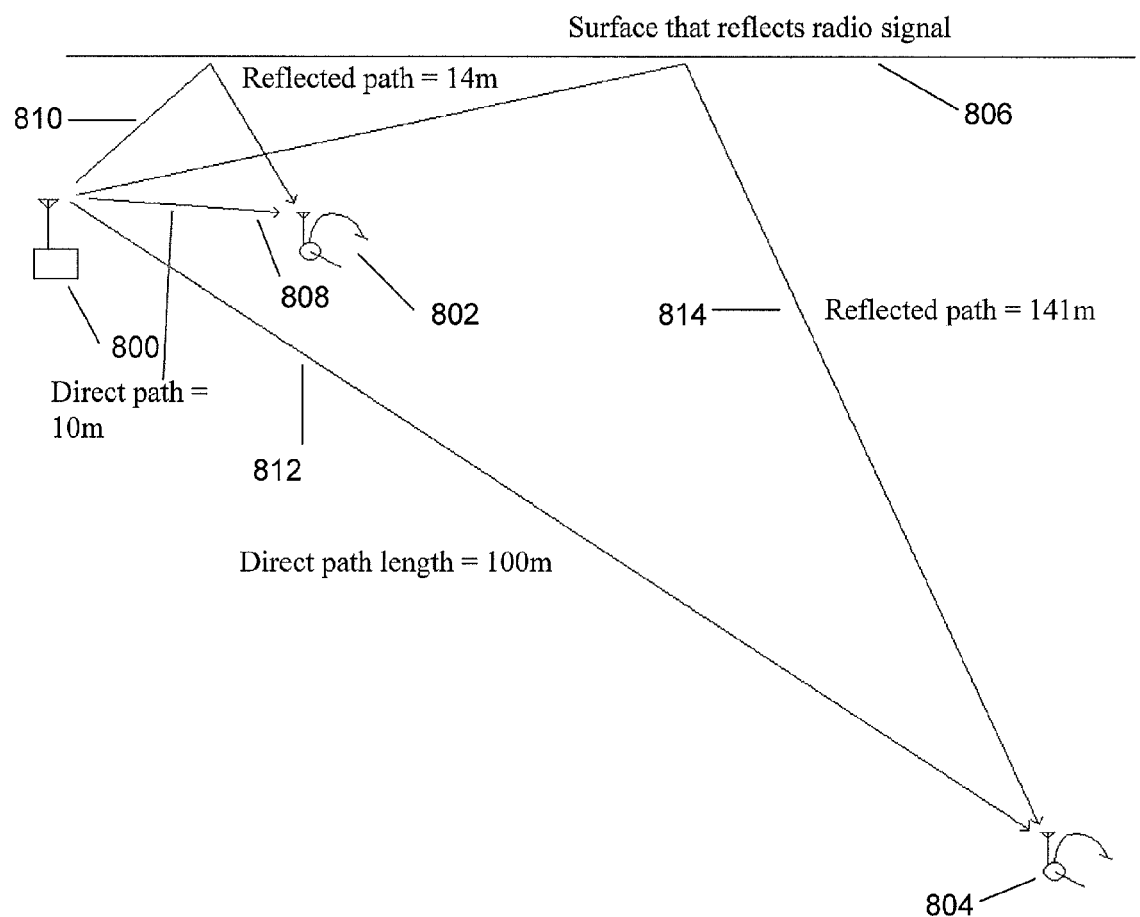
FIG. 8 is a diagram illustrating varying direct and reflected path lengths for a headset located at different distances from its radio base station.

FIGS. 8-10 illustrate determining range by examining the fading profile over time by calculating the autocorrelation of the RSSI as a function of frequency. The data set utilized to calculate the autocorrelation is the series of measurements of RSSI at different frequencies. The variable over which the autocorrelation is calculated is the frequency offset. Thus, the autocorrelation is calculated as a function of frequency offset of a data series consisting of the RSSI measured as a function of frequency. The concept of using the autocorrelation of RSSI vs. frequency as a function to measure range for a wireless headset system is based on the principle that, as range between the base and the headset increases, the difference in path length between the primary signal path and reflected paths with also increases. This in turn causes the variation of RSSI with frequency to be greater at longer range. An example with a simple geometry for two-ray signal propagation is shown in FIG. 8.

FIG. 8 is a diagram illustrating varying direct and reflected path lengths for a headset located at different distances from its radio base station. A simplified system for illustrating the concept shown in FIG. 8 includes a base station 800 that is the source of a radio signal, two headsets 802, 804 (headset 802 is at 10 m range and headset 804 is at 100 m range) and a single reflecting surface 806. The signal received at each headset is the vector sum of the direct-path signal and the reflected-path signal. As shown in FIG. 8, the signal received at headset 802 is the vector sum of the direct-path signal 808 and reflected-path signal 810. The signal received at headset 804 is the vector sum of the direct-path signal 812 and the reflected-path signal 814. For each headset, when the relative path lengths are such that the direct and reflected signals arrive in phase, the resultant sum is additive and the received signal level is higher than for just the direct path alone, and when the direct and reflected signals arrive out of phase the resultant sum is subtractive and the received signal level is less than for just the direct path alone. This effect is well known in radio signal propagation, and the attenuation observed for out-of-phase summation is called fading.

The path length difference between the direct and reflected rays introduces frequency-selectivity to the fading. For the same physical arrangement of transmitter, receiver and reflector, depending on the frequency being used, the path lengths will have a different amount of phase shift, and so for some frequencies the summation is additive and for some frequencies the summation is subtractive. The phase shift vs. frequency between the direct and reflective paths is larger for longer path length differences between the direct and reflected rays, which occurs at greater distance from the base. This effect results in greater variation in RSSI with frequency at longer range, as described and illustrated below in reference to FIGS. 9A and 9B.

Figure 9A:
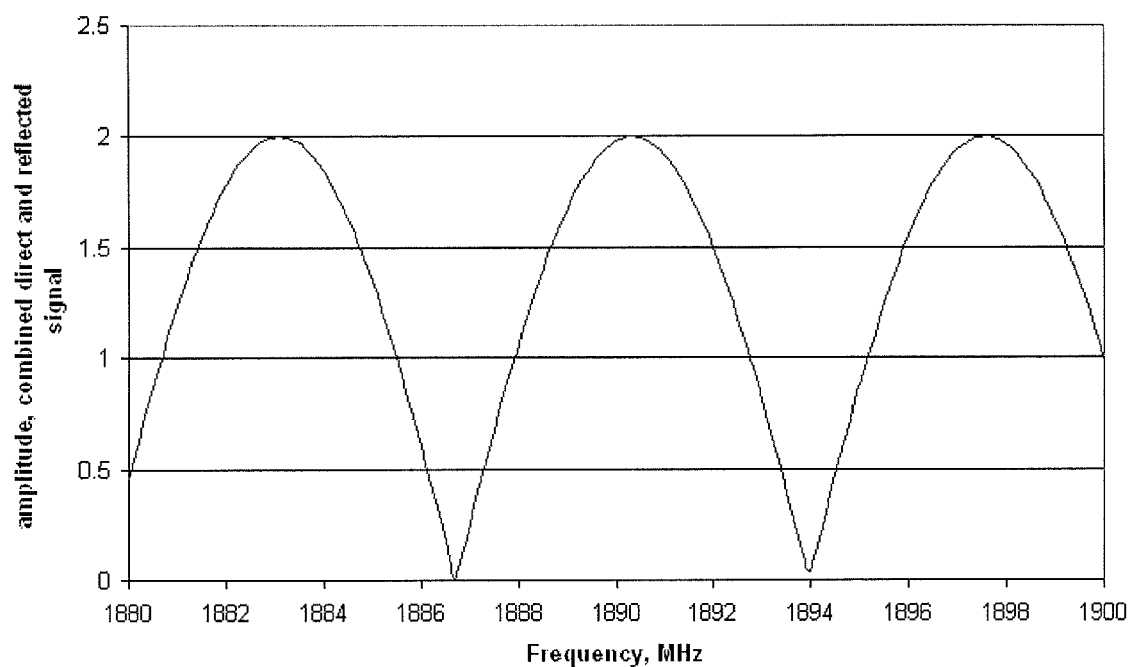
FIG. 9A is a graph of an example signal level RSSI vs. frequency in a two-ray ideal reflection environment at long range.
Figure 9B:
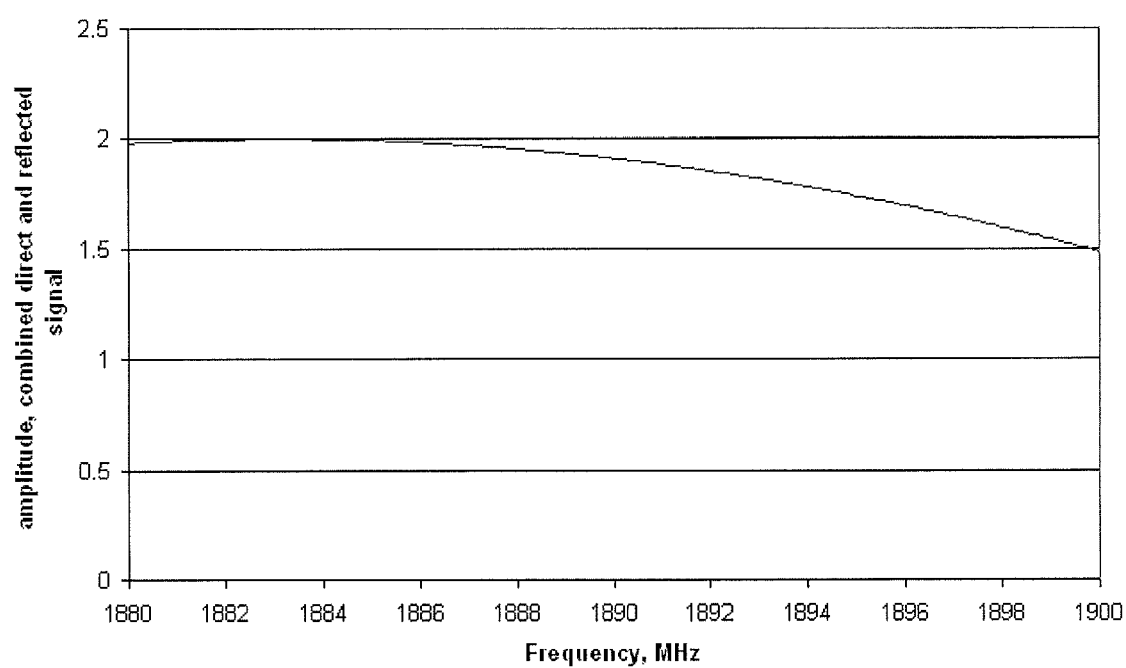
FIG. 9B is a graph of an example signal level RSSI vs. frequency in a two-ray ideal reflection environment at short range.

FIG. 9A is a graph of an example signal level RSSI vs. frequency in a two-ray ideal reflection environment at long range. FIG. 9B is a graph of an example signal level RSSI vs. frequency in a two-ray ideal reflection environment at short range. As shown in FIG. 9A, the RSSI varies in amplitude from 0.0 to 2.0 across the frequency band between 1880 MHz and 1900 MHz. As shown in FIG. 9B corresponding to a shorter range between the headset and base station, the RSSI varies in amplitude from only 1.5 to 2.0 across the same frequency band 1880 MHz and 1900 MHz.

Figure 10A:
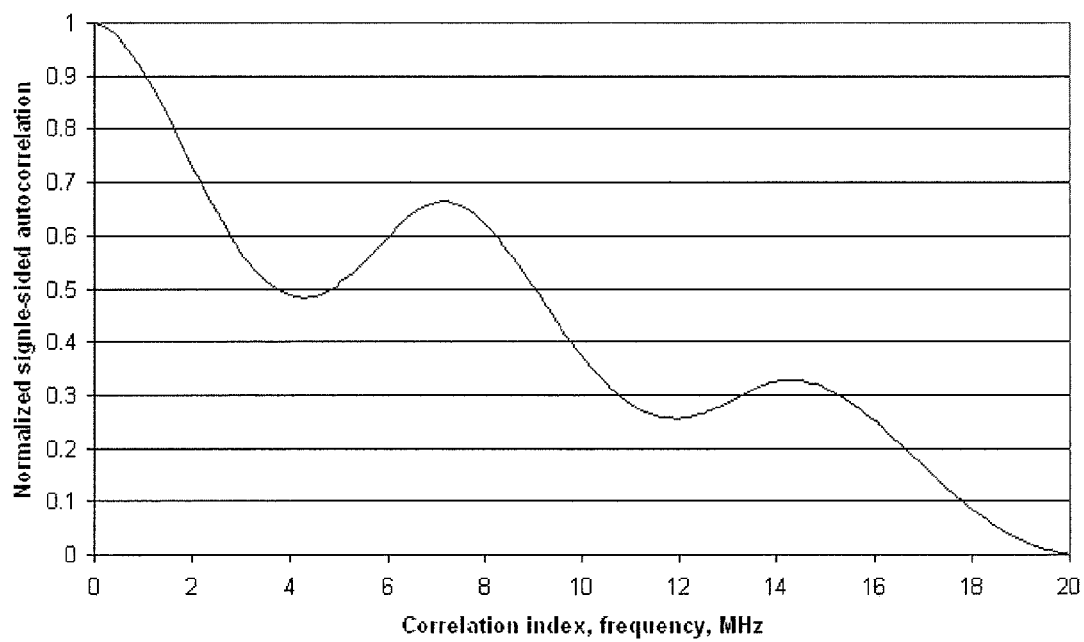
FIG. 10A is a graph illustrating single-sided normalized autocorrelation vs. frequency offset for RSSI vs. frequency data at long range.
Figure 10B:
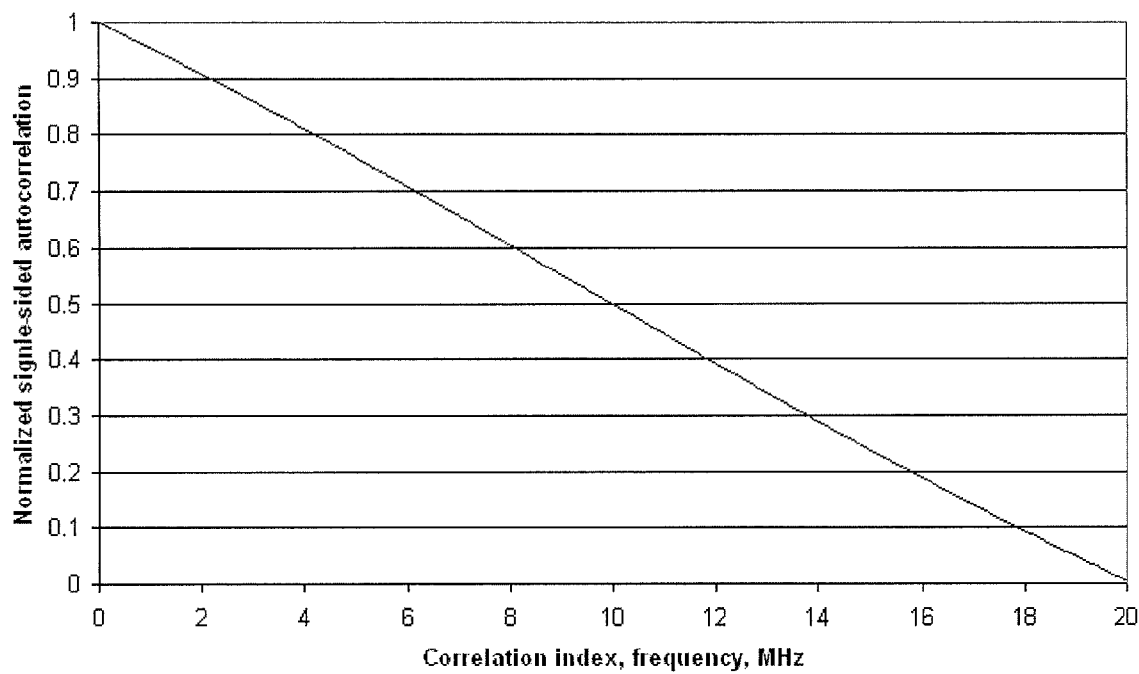
FIG. 10B is a graph illustrating single-sided normalized autocorrelation vs. frequency offset for RSSI vs. frequency data at short range.

The extent of variation in RSSI with frequency can be measured using an autocorrelation function, and exploited to estimate range. The estimation may need to be averaged over time in the manner known to those ordinarily skilled in the art for reducing the noise in a noisy signal. FIG. 10A is a graph illustrating single-sided normalized autocorrelation vs. frequency offset, for RSSI vs. frequency data at long range. FIG. 10B is a graph illustrating single-sided normalized autocorrelation vs. frequency offset, for RSSI vs. frequency data at short range. As illustrated in the examples in FIGS. 10A and 10B, the normalized single-sided autocorrelation for RSSI crosses a threshold at 0.7 at approximately 2.5 MHz at long range, and at approximately 6 MHz at short range. This is in consequence of the fact that the RSSI measurement vs. frequency at short range doesn't change much with large frequency differences, and changes a fair amount with frequency at long range.

A threshold is determined so that if the signal is above the threshold for a pre-determined range of frequencies, it's well-correlated. If the signal is below the threshold, it is poorly-correlated. Thus, the threshold is decided and how far away, in frequency, effectively, and carriers the threshold is satisfied. The selected threshold used may vary based on the given application. For example, the threshold of distance may be determined by how many carriers away the correlation is checked, and what frequency the system is operating at. If it is a 2.4 GHz system, an example selection may be that if the signal is still well-correlated 20 carriers away, which signifies the headset is within 10 feet of the base. The threshold may also be frequency-dependent, and dependent on whether the application is Bluetooth or DECT, the frequency band of operation, and other aspects of how the system is desired to operate. The reason the frequency band is important is because the phase shift that underlies this measurement technique is frequency-dependent. For a particular application, a set of equations can be written. Settings may also be determined empirically.

This example illustrates the elements of the concept of using RSSI variation with frequency to estimate the range at which a radio link is operating, when in a reflective environment. It is to be understood that this example is a simple case, and that an implementer ordinarily skilled in the art might use well-known means other than autocorrelation for determining the variation in RSSI with frequency, and that averaging or other multiple-sample processing would conventionally be used to reduce the effects of noise or sample variation statistics. In addition, the environment in which radio systems conventionally operate is ordinarily much more complex than that posed by the example of a single reflective surface; the concept of using the variation of RSSI with frequency remains valid in this more realistic case, though, since the core element of the increase in path length for the reflected vs. the direct ray(s) remains valid in the more complex case.

Figure 14A:
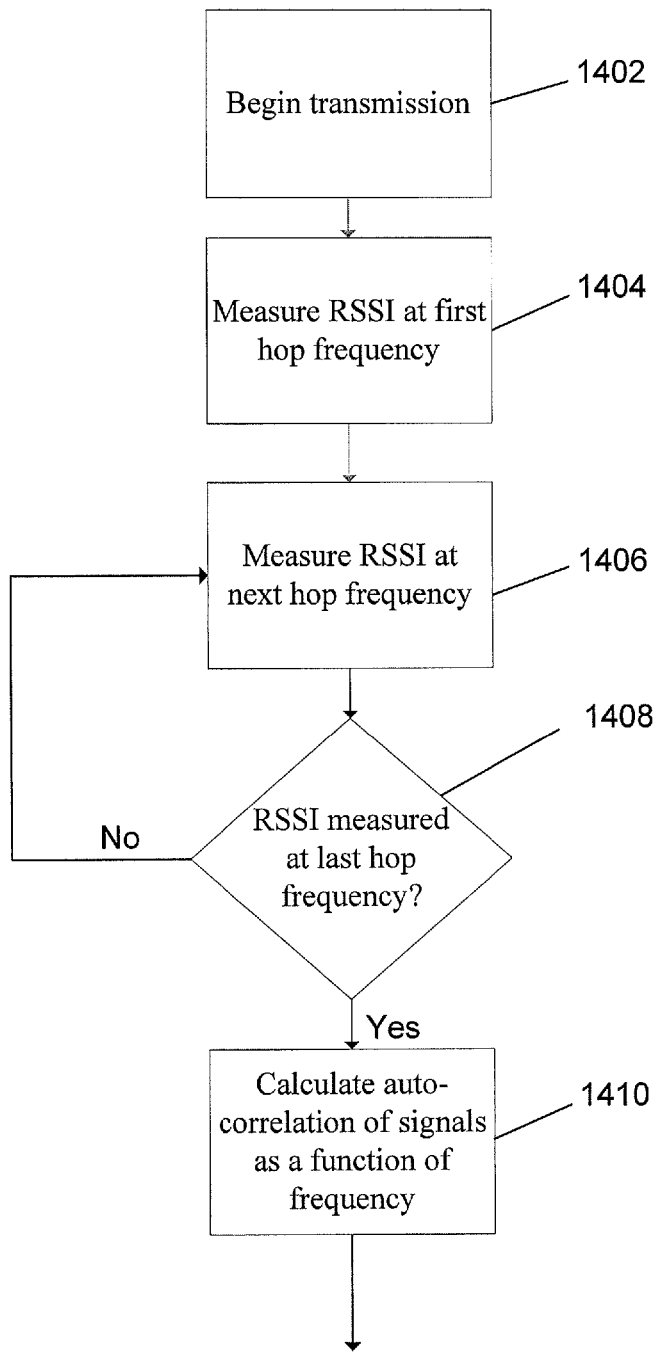
FIG. 14 is a flowchart illustrating a process by which the NEAR/FAR application determines NEAR/FAR status in one example.
Figure 14B:
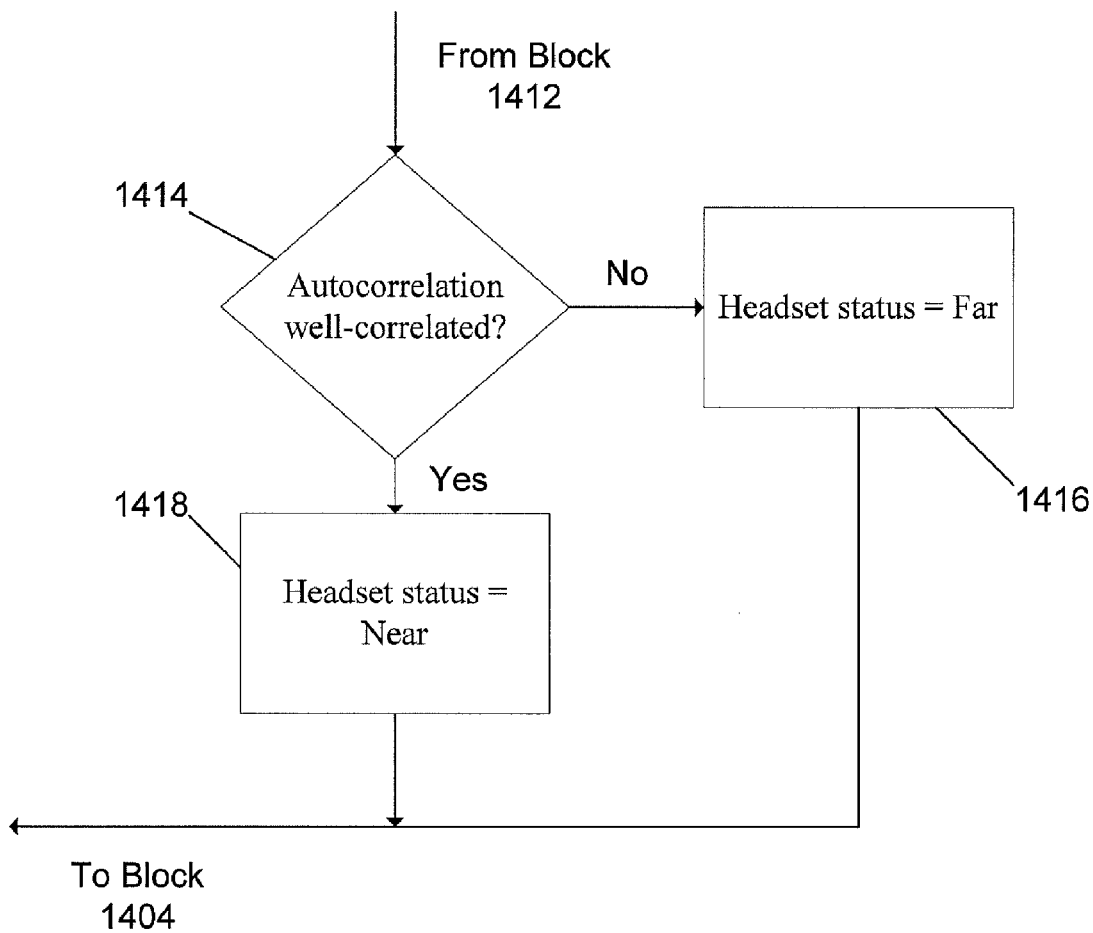

FIG. 14 is a flowchart illustrating a process by which the NEAR/FAR application determines NEAR/FAR status in one example. In this example, an autocorrelation method for a frequency hopped system such as Bluetooth is used, though this method may also be used for non-frequency hopped systems by using beacons. At block 1402 transmissions between a headset and base station begins. At block 1404, the RSSI is measured at a first hop frequency and stored in memory. At block 1406, the RSSI is measured at a next hop frequency. At decision block 1408, it is determined whether the RSSI measured at the previous hop frequency is the last hop frequency. If no, then the process returns to block 1406 until yes at block 1408. If yes at block 1408, then at block 1410, the autocorrelation of the signals as a function of frequency is calculated. At decision block 1414, it is determined whether the autocorrelation is well correlated. If no at decision block 1414, then at block 1416 the headset status is set to FAR status. If yes at decision block 1414, then the headset status is set to NEAR status at block 1418. The process then returns to block 1404.

Figure 11:
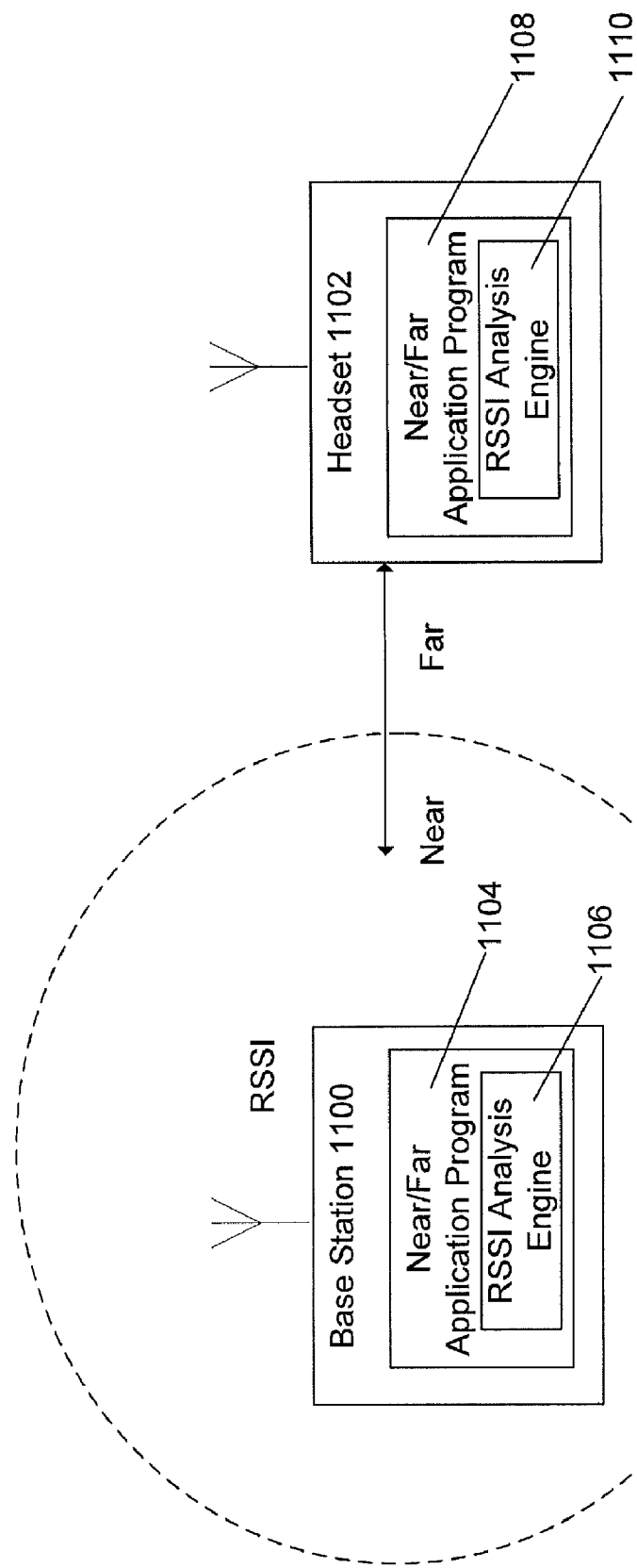
FIG. 11 illustrates NEAR/FAR sensing of a headset in relation to a base station in a further example.

FIG. 11 illustrates NEAR/FAR sensing of a headset in relation to a base station in a further example. In FIG. 11, both a base station 1100 and headset 1102 make independent determinations of Near/Far status using RSSI which are both used to determine a NEAR/FAR status. In one example, both must agree to report a Near/Far transition. Base station 1100 includes a NEAR/FAR application program 1104 having an RSSI analysis engine 1106. Headset 1102 includes a NEAR/FAR application program 1108 having an RSSI analysis engine 1110. This new algorithm has the base station measuring RSSI as well and voting on NEAR/FAR. Both units (the headset and base station) must agree on NEAR status or FAR status to report a NEAR/FAR transition to the presence subscriber.

The system in FIG. 11 operates on the principle that multipath can have selected polarizations. As a simplified example, if a horizontally polarized antenna is communicating to a vertically polarized one, and there is a multi-path bounce on a horizontally polarizing (vertically absorbing) surface, the horizontal antenna transmissions will pass unattenuated to the cross polarization (horizontal polarization) of the vertical antenna, but the vertical antenna transmissions will be attenuated to the cross polarization of the horizontal antenna. The result is multi-path nulls and peaks in different positions for each receiver (headset and base). As the headset crosses the NEAR/FAR border, eventually both antennas will agree and set the value to NEAR or FAR. Multipath effects will be less likely to falsely reset for occasional nulls and peaks of one receiver.

Figure 13A:
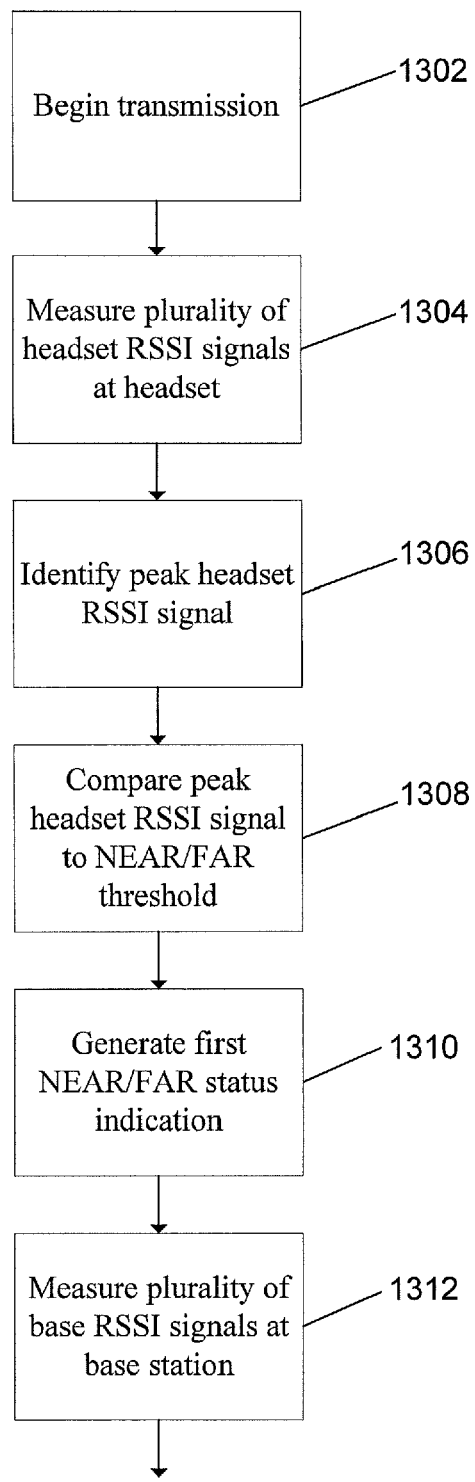
FIGS. 13A and 13B are a flowchart illustrating a process by which the system shown in FIG. 11 determines NEAR/FAR status.
Figure 13B:
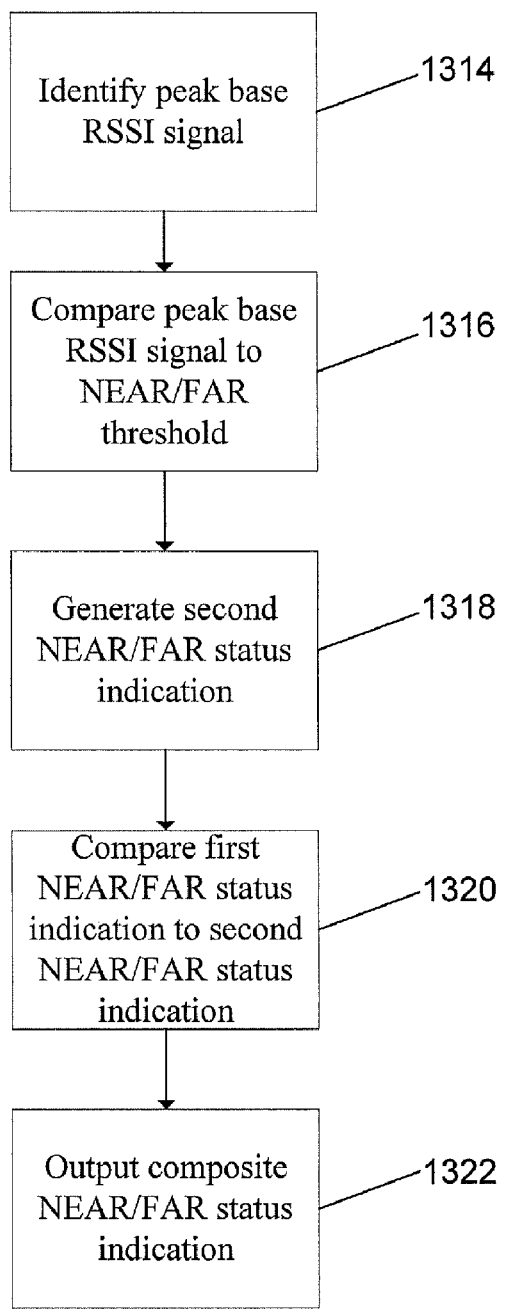

FIGS. 13A and 13B are a flowchart illustrating a process by which the system shown in FIG. 11 determines NEAR/FAR status. At block 1302, transmission between a headset and base station begins. At block 1304, a plurality of headset RSSI signals at the headset are measured. At block 1306, the peak headset RSSI signal is identified. At block 1308, the peak headset RSSI signal is compared to a NEAR/FAR RSSI threshold value. Based upon this comparison, as described above, at block 1310 a first NEAR/FAR status indication is generated. For example, if the peak headset RSSI signal is less than the NEAR/FAR RSSI threshold, then the headset is assigned a FAR status. If the peak headset RSSI signal is not less than the NEAR/FAR RSSI threshold, then the headset is assigned a NEAR status.

At block 1312, a plurality of base RSSI signals at the base station are measured. At block 1314, the peak base RSSI signal is identified. At block 1316, the peak base RSSI signal is compared to a NEAR/FAR RSSI threshold value. Based upon this comparison, at block 1318 a second NEAR/FAR status indication is generated. At block 1320, the first NEAR/FAR status indication generated at the headset is compared to the second NEAR/FAR status indication generated at the base station. At block 1322, the resulting composite NEAR/FAR status indication is output. In one example, both a base station and headset make independent determinations of Near/Far status using RSSI and both must agree to report a Near/Far transition.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For example, the methods and systems described herein may be applied to other body worn devices in addition to headsets. Furthermore, the functionality associated with any blocks described above may be centralized or distributed. It is also understood that one or more blocks of the headset may be performed by hardware, firmware or software, or some combinations thereof. Such modifications and changes do not depart from the true spirit and scope of the present invention that is set forth in the following claims.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for determining a near status or a far status of a headset in relation to a base unit comprising:
    measuring a plurality of RSSI signals, wherein each RSSI signal of the plurality of RSSI signals is measured at a different carrier frequency;
    identifying a peak RSSI signal in the plurality of RSSI signals;
    comparing the peak RSSI signal to a near/far threshold RSSI value; and
    generating a near status or far status indication responsive to comparing the peak RSSI signal to the near/far threshold RSSI value.

2. The method of claim 1, wherein measuring a plurality of RSSI signals, wherein each RSSI signal of the plurality of RSSI signals is measured at a different carrier frequency, comprises measuring RSSI signals at a plurality of hop frequencies in a Bluetooth system.

3. The method of claim 1, wherein measuring a plurality of RSSI signals, wherein each RSSI signal of the plurality of RSSI signals is measured at a different carrier frequency, comprises measuring RSSI signals at a plurality of selected frequencies in a non-frequency hopped system.

4. The method of claim 3, wherein the non-frequency hopped system comprises a DECT system.

5. The method of claim 3, wherein measuring RSSI signals at a plurality of selected frequencies in a non-frequency hopped system is performed at a time or frequency not normally used for data communication.

6. The method of claim 1, wherein measuring a plurality of RSSI signals is performed at either a headset or a headset base station.

7. The method of claim 1, wherein the near/far threshold RSSI value is a value above which a headset is in a near status and below which the headset is in a far status.

8. The method of claim 1, wherein generating a near status or far status indication responsive to comparing the peak RSSI signal to the near/far threshold RSSI value comprises employing a hysteresis to prevent rapid toggling between near status and far status.

9. A method for determining a near status or a far status of a headset in relation to a base unit comprising:
measuring a plurality of headset RSSI signals at a headset, wherein each headset RSSI signal of the plurality of headset RSSI signals is measured at a different carrier frequency;
identifying a peak headset RSSI signal in the plurality of headset RSSI signals;
comparing the peak headset RSSI signal to a headset near/far threshold RSSI value;
generating a first near status or far status indication responsive to comparing the peak headset RSSI signal to a headset near/far threshold RSSI value;
measuring a plurality of base station RSSI signals at a base station, wherein each base station RSSI signal of the plurality of base station RSSI signals is measured at a different carrier frequency;
identifying a peak base station RSSI signal in the plurality of base station RSSI signals;
comparing the peak base station RSSI signal to a base station near/far threshold RSSI value;
generating a second near status or far status indication responsive to comparing the peak base station RSSI signal to a base station near/far threshold RSSI value;
comparing the first near status or far status indication and the second near status or far status indication and responsively outputting a third near status or far status indication.

10. The method of claim 9, wherein measuring a plurality of headset RSSI signals, wherein each headset RSSI signal of the plurality of headset RSSI signals is measured at a different carrier frequency, comprises measuring headset RSSI signals at a plurality of hop frequencies in a Bluetooth system.

11. The method of claim 9, wherein measuring a plurality of headset RSSI signals, wherein each headset RSSI signal of the plurality of headset RSSI signals is measured at a different carrier frequency, comprises measuring headset RSSI signals at a plurality of selected frequencies in a non-frequency hopped system.

12. A method for determining a near status or a far status of a DECT headset in relation to a base unit comprising:
selecting a plurality of frequency beacons within a DECT frequency bandwidth;
measuring a plurality of RSSI signals, wherein each RSSI signal of the plurality of RSSI signals is measured at a different frequency beacon;
identifying a peak RSSI signal in the plurality of RSSI signals;
comparing the peak RSSI signal to a near/far threshold RSSI value; and
generating a near status or far status indication.

13. The method of claim 12, wherein measuring a plurality of RSSI signals, wherein each RSSI signal of the plurality of RSSI signals is measured at a different frequency beacon is performed at a time or frequency not normally used for data communication.

14. A wireless headset comprising:
a wireless transceiver for sending and receiving signals;
a memory storing a near/far application program for determining a near status or a far status of the headset relative to a base station; and
a processor for executing the near/far application program to process a plurality of RSSI signals measured at different carrier frequencies, wherein a peak RSSI signal in the plurality of RSSI signals is identified and compared to a near/far threshold RSSI value to generate a near status or far status indication.

15. The wireless headset of claim 14, further comprising a sensor.

16. The wireless headset of claim 15, wherein the sensor comprises a motion detector.

17. The wireless headset of claim 15, wherein the sensor comprises one selected from the group consisting of an infrared detector, a pyroelectric sensor, a capacitance circuit, a micro-switch, an inductive proximity switch, a skin resistance sensor, and at least two pyroelectric sensors for determining a difference in temperature readings from the two pyroelectric sensors.

18. The wireless headset of claim 14, wherein the wireless transceiver comprises a DECT transceiver, Bluetooth transceiver, or IEEE 802.11 transceiver.

19. A wireless headset comprising:
a measuring means for measuring a plurality of RSSI signals, wherein each RSSI signal of the plurality of RSSI signals is measured at a different carrier frequency;
an identifying means for identifying a peak RSSI signal in the plurality of RSSI signals;
a comparison means for comparing the peak RSSI signal to a near/far threshold RSSI value and responsively generating a near status or far status indication.

20. The wireless headset of claim 19, wherein the detector means comprises a motion detecting means for detecting headset movement.

21. A wireless headset base station comprising:
a network interface;
a wireless transceiver for sending and receiving signals;
a memory storing a near/far application program for determining a near status or a far status of the headset relative to a base station; and
a processor for executing the near/far application program to process a plurality of RSSI signals measured at different carrier frequencies, wherein a peak RSSI signal in the plurality of RSSI signals is identified and compared to a near/far threshold RSSI value to generate a near status or far status indication.

22. The wireless headset base station of claim 21, further comprising an IEEE 802.11 access point.

23. The wireless headset base station of claim 21, wherein the network interface comprises an interface to a public switched telephone network, integrated services digital network, local area network, or wireless local area network.

24. The wireless headset base station of claim 21, wherein the wireless transceiver comprises a DECT transceiver, Bluetooth transceiver, or IEEE 802.11 transceiver.

* * * * *

UNITED STATES PATENT AND TRADEMARK OFFICE
CERTIFICATE OF CORRECTION

| | | |
|---|---|---|
| PATENT NO. | : 8,270,905 B1 | Page 1 of 1 |
| APPLICATION NO. | : 11/906670 | |
| DATED | : September 18, 2012 | |
| INVENTOR(S) | : Stephen V. Cahill et al. | |

It is certified that error appears in the above-identified patent and that said Letters Patent is hereby corrected as shown below:

On the Title page of the patent, item (73), Assignee, "Plantroncis, Inc." should read --Plantronics, Inc.--.

Signed and Sealed this

Eighth Day of January, 2013

David J. Kappos
*Director of the United States Patent and Trademark Office*